Dec. 13, 1966 W. J. PARKIN 3,290,786
ATTITUDE SENSING APPARATUS
Filed Nov. 1, 1963 2 Sheets-Sheet 1

INVENTOR.
WILLIAM J. PARKIN
BY David A. Rich
ATTORNEY

EQUIVALENT CIRCUIT

INVENTOR.
WILLIAM J. PARKIN
BY David A. Rich
ATTORNEY

United States Patent Office 3,290,786
Patented Dec. 13, 1966

3,290,786
ATTITUDE SENSING APPARATUS
William J. Parkin, Natick, Mass., assignor to Mithras, Inc., Cambridge, Mass., a corporation of Delaware
Filed Nov. 1, 1963, Ser. No. 320,900
5 Claims. (Cl. 33—206)

The present invention relates to attitude sensing apparatus and devices. More particularly, the invention relates to an automatic leveling device.

This application is related to my co-pending applications entitled, Tracking System, Serial No. 253,504; Radiant Energy Detector, Serial No. 253,503; and Tracking Circuit, Serial No. 272,181.

Detector elements having a change in electrical characteristics in response to the attitude of a plane surface relative to a gravitational field are broadly useful in the invention. Of particular use in the invention are detector elements having variable impedance or resistivity in response to attitude changes. Such an element is sometimes referred to as a vertical sensor in the art.

Prior art vertical sensors present an indication of attitude changes with respect to a given horizontal axis. An elongated tube, for example, having an air bubble provides an indication of an attitude with respect to a transverse horizontal axis.

By orienting a pair of such elements either in coplanar or parallel plane relationship and extending orthogonally relative to each other, a surface may be leveled with respect to a pair of orthogonal horizontal axes.

Vertical sensors for providing an output electrical signal relative to a given horizontal axis are known in the art. Circuits are known, for example, for utilizing a vertical sensor having a pair of electrodes extending into an electrolytic fluid. A third electrode in contact with the fluid is centrally disposed between the other two electrodes. By measuring the impedance between two pairs of the electrodes, including the centrally disposed electrode, a balance or unbalance condition may be determined. By using a pair of such elements, output signals with respect to a pair of orthogonal horizontal axes may be obtained. In contrast the apparatus of the present invention provides a composite output signal having resolvable orthogonal components and obtained from a single five terminal sensing element.

In an article entitled "Vertical Sensors Made of Glass" appearing in Electronics, April 5, 1963, page 60, a vertical sensor and circuit are described and illustrated somewhat similar to that of the instant invention. The sensing element of the present invention is distinguishable from that in the publication in utilizing at least five electrodes including a centrally disposed electrode as opposed to the four terminal device illustrated.

The automatic leveling apparatus of the present invention is further distinguishable from that of the publication in that the invention utilizes an alternating current quadrature phased pair of bias signals in contrast with the single phase excitation shown. Furthermore, the instant invention was indeed reduced to practice prior to the publication date of that article.

It is, therefore, an object of the invention to provide an improved attitude sensing device for providing an indication of attitude with respect to a pair of orthogonal horizontal axes.

A further object of the invention is to provide an improved automatic leveling apparatus for automatically controlling the attitude of a surface relative to a vertical vector.

Yet another object of the invention is to provide an improved attitude sensing device of high accuracy.

Still another object of the invention is to provide an improved attitude sensing device which is reliable and exhibits a high degree of simplicity.

Yet another object of the invention is to provide an improved automatic leveling apparatus exhibiting a high degree of stability.

In accordance with the invention there is provided an attitude sensing device. The device includes a housing and conductive fluid in the housing. A plurality of electrodes are mechanically coupled to the housing in a rhombic pattern and extend into the fluid. A central electrode is mechanically coupled to the housing and is centrally disposed with respect to the rhombic pattern. The electrical impedance between the rhombic electrodes and the central electrode vary in accordance with the attitude of the housing relative to the surface level of the fluid. Means are coupled to the electrode for adapting the element for coupling to an electrical circuit.

PRINCIPLES OF OPERATION

The automatic leveling apparatus of the present invention, as distinguished from the prior art, provides, in effect, a rotating field detector. This result is obtained by using a pair of alternating current, bias signals, which are in quadrature. By employing a cell having four ohmic terminals connected to the cell in a rhombic pattern, diagonally opposed pairs of terminals provide orthogonal axes.

With an ohmic terminal or electrode disposed in the center of the rhombic pattern, an alternating current signal applied to a pair of diagonally opposed collinear terminals produces zero output unless an impedance unbalance occurs between the central terminal and one of the opposed bias terminals relative to the other. This resultant effect produces an output error signal, the amplitude of which provides the necessary information to determine the degree of offset of a plane surface from, for example, a vertical vector. By introducing another alternating current across an axis physically orthogonal to the first axis as defined by the terminals, the information may be obtained for the other of a pair of orthogonal reference horizontal axes.

The effect of introducing a pair of quadrature phase bias alternating currents signals to such a detector is to produce a rotating field. Because of the rotating field, a plane surface off level produces an error signal which varies in phase as well as amplitude. This phase variation enables the resolution from the resultant output error signal of orthogonal vertical error signal components, relative to the orthogonal horizontal reference axes.

DESCRIPTION AND EXPLANATION OF THE SENSING ELEMENT IN FIG. 1

Figure 1:
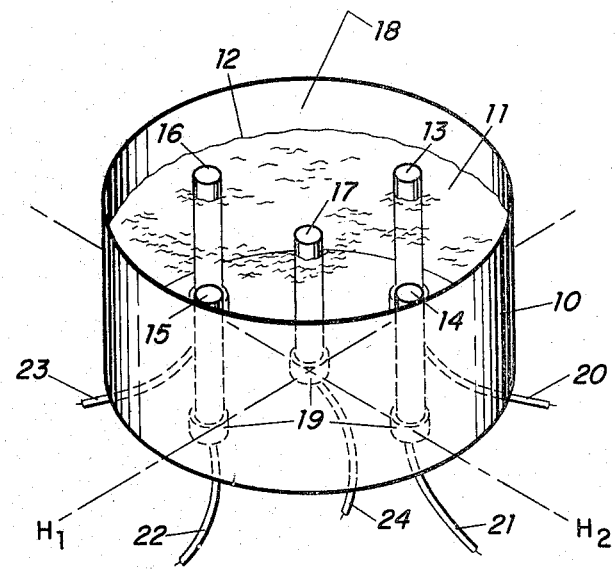
FIG. 1 is an isometric view, partially schematic, of an attitude sensing device embodying the principles of the invention.

Referring now to the drawings and with particular reference to FIG. 1, there is here illustrated an attitude sensing device useful in practicing the invention. A housing 10 carries a conductive fluid 11 at a liquid level indicated at 12. The housing is rotatable about each of a pair of horizontal axes indicated $H_1$ and $H_2$. A plurality of electrodes 13–16 are disposed in a rhombic pattern and mechanically coupled to the housing in insulated spaced relation. A central electrode 17 is mechanically coupled to the housing.

The housing may be covered and sealed to provide an entrapped air space 18. The electrodes 13–16 extend into the fluid. The central electrode is in contact with the fluid and electrically equidistant from the electrodes 13–16. Rotation of the housing about axis $H_1$ changes the resistivity between central electrode 17 and axis defining electrodes 14 and 16. Rotation of the housing to the right, as shown, increases the amount of conductive fluid between electrodes 14 and 17 to decrease the resistance between them. Conversely, the amount of conductive fluid between electrodes 16 and 17 decreases to increase the resistance between them.

When the housing is level relative to the surface of the fluid, the resistance between electrodes 16 and 17 and the electrodes 14 and 17 are precisely equal in the ideal case. When the housing is rotated about the axis $H_1$ the resistances are unbalanced and a net differential resistance results. As shown in FIG. 1, the electrodes are disposed in diagonally opposed, axis defining pairs. Electrodes 13 and 15 coincide with $H_1$ and electrodes 14 and 16 coincide with the axis $H_2$. The electrodes, as shown, are elongated and extend into the conductive fluid 11. Hermetically sealed insulators 19 mechanically couple the electrodes to the housing 10 and provide support for electrical connections to the electrodes. Thus, electrical connection wires 20–24 are connected to corresponding electrodes 13–17, inclusive, respectively.

DESCRIPTION AND EXPLANATION OF THE CIRCUITS IN FIGS. 2 AND 3

Figure 2:
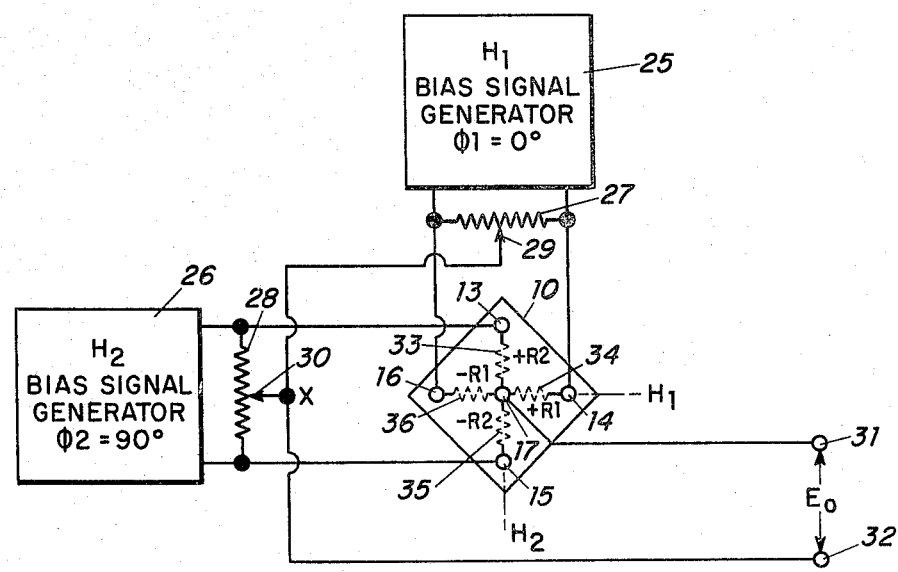
FIG. 2 is a schematic circuit diagram of a circuit illustrating the principles of the invention.

Referring now to FIG. 2, a schematic circuit diagram of an attitude sensing apparatus illustrating the principles of the invention is here ilustrated. Here an attitude responsive, variable impedance, detector element, such as the attitude sensing device in FIG. 1, provides the basic attitude sensing element for the circuit. In the drawings like elements are indicated with like reference numerals. The sensing element is shown coupled to a pair of quadrature phased bias signal generators. Balancing means potentiometers are coupled in parallel with the bias generators.

Thus the attitude sensing element 10 having four input ohmic bias electrodes 13–16 disposed in a square, or more generally a rhombic pattern and a centrally disposed, output ohmic terminal 17 provides the basic sensing element. Biasing means, here designated as $H_1$ bias signal generator 25 and $H_2$ bias signal generator 26, are each coupled to a pair of diagonally opposed input bias electrodes. The generator 25 couples a reference phase bias signal, $\phi 1 = 0°$, to the diagonally opposed electrodes 14 and 16. The generator 26 couples a quadrature phase bias signal, $\phi 2 = 90°$, to the other two input electrodes 13 and 15. The bias signals are thus in phase quadrature.

A balancing means, here shown including potentiometer stators 27 and 28 are coupled respectively between the generatos 25 and 26 and the element 10. The potentiometers or variable resistors have variable electrical connections 29 and 30 coupled respectively to the stators 27 and 28. The variable connections are joined at a junction indicated as X. An output signal $E_0$ appears between the terminals 31 and 32. The terminal 31 is connected directly to the output electrode 17 of the element 10. The terminal 32 is connected to the junction point X. The balancing means are thus coupled to the bias means between the element and the bias means for each of the bias signals. The balance means include a variable voltage control for producing a variable reference voltage level to balance the quadrature and output signals with respect to the reference level. The internal equivalent resistance of the attitude sensing device is indicated in dashed lines by the phantom lumped constant resistors 33–36 connected between the output electrode 17 and the input bias electrodes 13–16. The variable connection 30 of the balancing potentiometer 28 may be adjusted to balance the output signal $E_0$ relative to the reference voltage level at the point X to produce, for example, zero $H_2$ voltage output between the terminals 31 and 32. Similarly, the variable connection 29 may be adjusted to produce a zero $H_1$ voltage output. In this manner the quadrature and output signals are balanced relative to the reference voltage level at the point X. Note that with respect to the point X the reference bias signal can be adjusted independently from the quadrature bias signal.

The circuit as illustrated responds to an attitude change or unbalance signal to produce an output signal. The balance condition described above is determined for the purpose of producing an output signal in response to an attitude change. A change in attitude produces effective rotation about the $H_1$ and $H_2$ axes. Rotation to the left about the $H_2$ axis, electrodes 13 and 15, has, e.g., the effect of reducing the resistance $+R1$ and increasing $-R1$ to produce an unbalance $H_1$ signal, $\phi 1 = 0°$ at the output.

Figure 3:
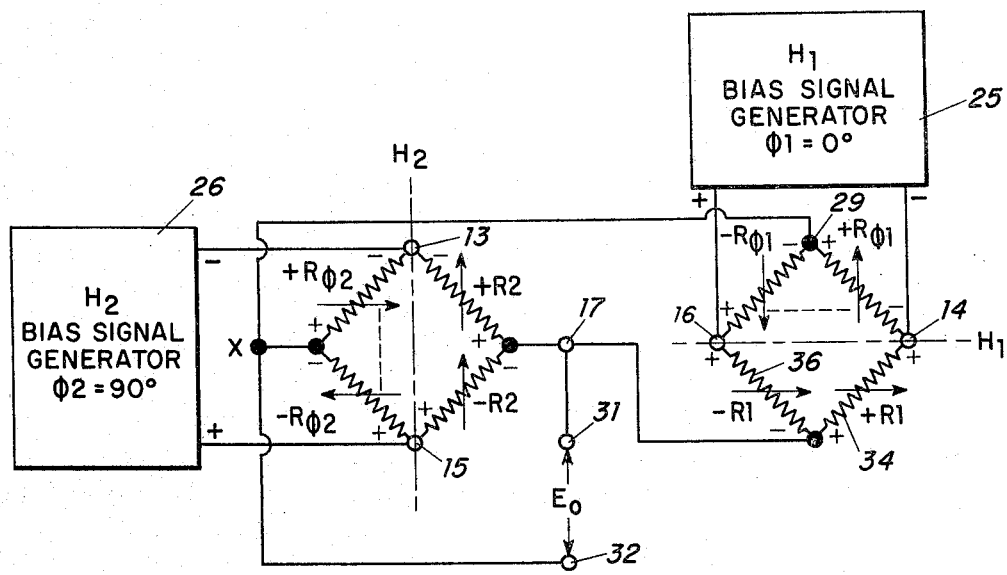
FIG. 3 is an equivalent circuit of the circuit in FIG. 1.

Referring particularly to FIG. 3, assume an input voltage, for example, of 100 volts appearing between the electrodes 13 and 15, then the voltage potentials for a balanced condition are equal and opposite for the circuit taken with respect to the electrodes 31 and 32. For the balanced condition the potential across each resistor is 50 volts. Starting with the terminal 22, the voltage across the resistor $+R2$ is equal and opposite to the voltage across the resistor $+R_{\phi 2}$. Similarly, the voltage across the resistor $-R2$ is equal and opposite to that across the resistor $-R_{\phi 2}$.

Now consider an unbalance between the bias voltages appearing across the resistors $+R_{\phi 2}$ and $-R_{\phi 2}$, for example, a voltage across $+R_{\phi 2}$ of 10 volts. Then the voltage across $-R_{\phi 2}$ is 90 volts. Starting from electrode 31, the voltage across $+R2$ is $+50$ volts added to the 10 volts across $+R_{\phi 2}$ to produce an output voltage of $+40$ volts. Going the other way from the electrode 31, the voltage across $-R2$ is $-50$ volts in series with the $+90$ volts across $-R_{\phi 2}$ to produce again $+40$ volts. Note that the reference voltage level in this condition may be taken to be $+40$ volts. If the resistance $\pm R2$ were internally unbalanced correspondingly in the same proportion, 10 volts would appear across $+R2$ and 90 volts across $-R2$ to produce an output signal $E_0$ of zero volts for no signal or level condition.

For the condition in which the voltages across $\pm R2$ are initially balanced, rotation of electrode 13 into the drawing, as shown, about the $H1$ axis tends to decrease the resistance $+R2$ and increase $-R2$. Assuming that the voltage across $+R2$ is 40 volts and across $-R2$ is 60 volts, the output signal voltages at the electrodes 31 and 32 becomes 10 volts. It may be seen that the $H2$ signal component in the output signal $E_0$ is a function of the variation in impedance of $\pm R2$ in response to rotations about the $H1$ axis.

The resultant 10 volt output signal for an unbalance of 10 volts across $+R2$ with $\pm R_{\phi 2}$ balanced, may be readily determined. The $+40$ volts across $+R2$ and the $-50$ volts across $+R_{\phi 2}$ yield $-10$ volts output; the $-60$ volts across $-R2$ and the $+50$ volts across $-R_{\phi 2}$ yield again $-10$ volts.

Noting that the output signal $E_0$ is indeed a composite signal including both the $H1$ and the $H2$ components, the above analysis is equally appropriate to the circuit associated with reference to the $H1$ bias signal generator 25. Once the system is balanced as, for example, by a predetermined setting, the output signal is a function of the unbalance impedance, e.g., due to attitude changes. Note that the degree of attitude change, angular displacement, is indicated by the amplitude of $E_0$ for each component. The direction of attitude change is indicated by phase.

As shown particularly in FIG. 3 by simply adjusting the variable potentiometer electrical connections, the output signal reference level may be varied enormously. From the above description it will be apparent that the present invention presents an attitude sensing circuit not only reduced in complexity, but substantially increased in flexibility.

DESCRIPTION AND EXPLANATION OF THE AUTOMATIC LEVELING APPARATUS IN FIG. 4

Figure 4:
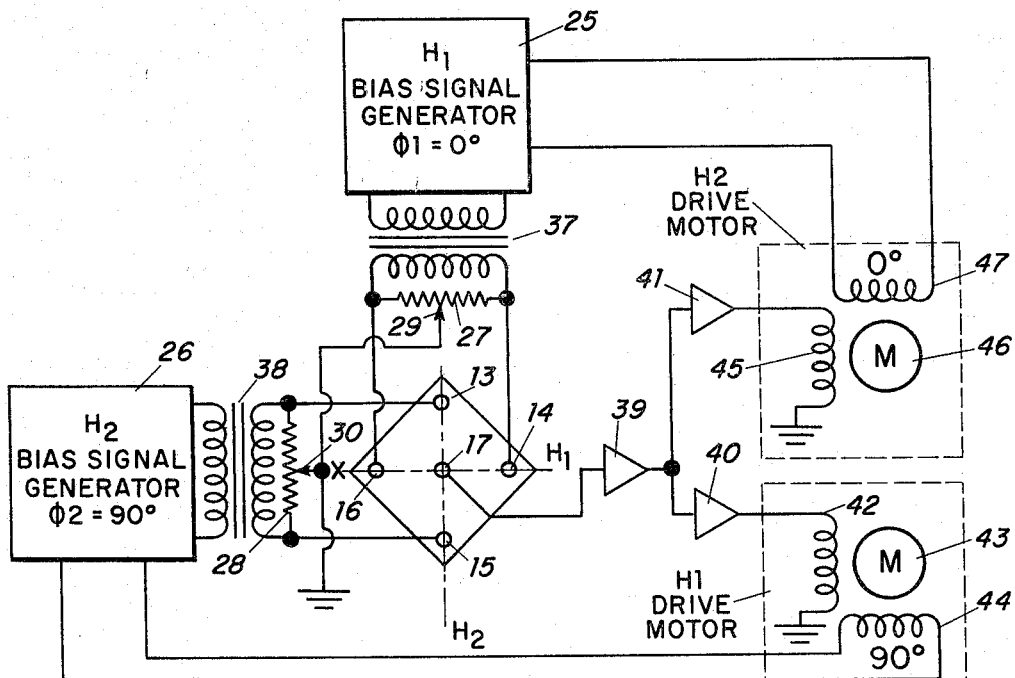
FIG. 4 is a schematic circuit diagram of a sensing apparatus embodying the invention.

Referring now to FIG. 4, there is here illustrated a schematic circuit diagram of an automatic leveling apparatus. The apparatus includes a mounting means including a movable member with two degrees of freedom to carry attitude sensing device. For purposes of clarity, the mount means and the movable member are not shown. Here again the sensing device includes four input bias electrodes arranged, for example, in a rhombic pattern and an output terminal centrally disposed with respect to the pattern. Biasing means are coupled to the device through the input electrodes for providing a pair of alternating current bias signals through the element. The bias signals are in phase quadrature. Output means are coupled to the device through the output electrode for providing H1 and H2 drive control signals indicative of attitude. Balancing means are coupled to the biasing means between the biasing means and the device for balancing the quadrature signals and provide a null reference. Drive means are coupled to the output means for controlling the orientation of the movable member in response to the drive control signals.

Thus, in FIG. 4, the attitude sensing device having input electrodes 13–16 and an output electrode 17, is shown connected to a pair of bias transformers 37 and 38.

A source of phase $\phi 1$ bias signal is derived from the H1 bias signal generator 25 and phase $\phi 2$ from the H2 bias signal generator 26. The phase bias signals are coupled as shown to the primaries of the transformers 37 and 38. The secondary windings of the transformers 37 and 38 are connected to the respective electrode pairs 14, 16, and 13, 15. The output is coupled from the output electrode 17 to the input of an amplifier 39.

The output of the amplifier 39 is coupled to an H1 drive signal amplifier 40 and, in parallel, to an H2 drive signal amplifier 41. The output of the amplifier 40 is coupled to a control winding 42 of an H1 drive motor 43. A reference winding 44 of the motor 43 is coupled back to the H2 generator 26. The output of the amplifier 41 is coupled to a control winding 45 of an H2 drive motor 46. The reference winding 47 of the motor 46 is coupled back to the H1 generator 54.

Balancing potentiometers 27 and 28 are coupled in parallel respectively with the secondary windings of the transformers 37 and 38. The variable potentiometer electrical connections 29 and 30 are at ground potential. The variable potentiometer electrical connections are electrically connected together and the output signal appears at the output electrode 17 with respect to a reference ground voltage potential.

In the system as described, the attitude sensor is mounted on a movable member which is controlled in orientation of the drive motors 43 and 46. When the attitude of the housing 10 changes from a level or balanced condition, an output signal is produced which is amplified at the amplifier 39 and applied through the amplifiers 40 and 41 to the control windings of the motors 43 and 46. The motors are preferably dual phase induction motors. They operate on the principle of providing maximum rotation in a given direction when the phase of the energy on the control winding is 90° out of phase with the energy on the reference winding. Speed of rotation is a function of both the phase difference between the drive control signal on the control winding and the amplitude of the drive control signal. The direction of rotation is a function of the phase difference as well. For example, when the phase difference is $-90°$, the motor rotates in one direction and when the phase difference is $+90°$, the motor rotates in the opposite direction.

The indicated phase of each reference winding 44 and 47 of the motors 43 and 46 is a $+90°$ and $0°$, respectively. Since the phase of each control winding, for maximum torque for a given amplitude, must be at quadrature with its corresponding reference winding, a variable phase control may be provided in the amplifiers 40 and 41. A phase compensation capacitor may be placed in the amplifiers 40 and 41. In addition, a phase capacitor may be placed in series with each reference winding.

When an error signal is applied to the control windings, a correction is made by the H1 drive motor with respect to $\phi 2$ and the horizontal axis H1. The H2 drive motor corrects with respects to $\phi 1$ and the horizontal axis H2 to orient the housing 10 with respect to a level condition. This automatic leveling apparatus is thus a null-seeking system.

From the foregoing discussion, it will be apparent that the invention has broad application for leveling requirements. Thus, the invention has application for leveling instruments, for navigation, surveying, and other triangulation measurements, machines and moving vehicles.

While there has hereinbefore been presented what at present are considered to be the preferred embodiments of the invention, it will be apparent to those of ordinary skill in the art that many modifications and changes may be thereto made without departing from the true spirit and scope of the invention.

It will be considered, therefore, that all those changes and modifications which fall fairly within the scope of the invention shall be a part of the invention.

What is claimed is:

1. Automatic leveling apparatus, comprising:
   mount means including a movable member with two degrees of freedom;
   an attitude responsive, electrolytic detector element carried by said mount means, said element having a movable conductive fluid and, extending into said fluid, four input ohmic bias electrodes arranged in a rhombic pattern and an output ohmic electrode centrally disposed with respect to said pattern;
   reference phase bias signal means coupled to a pair of horizontal axis-defining, diagonally opposed said input terminals for coupling said element to a source of alternating current reference phase bias signal through said fluid;
   reference phase balance means coupled to said reference bias means and including means for adjusting the voltage between said output electrode and said horizontal axis-defining pair of input electrodes;
   quadrature phase bias signal means coupled to the other pair of orthogonal horizontal axis-defining, diagonally opposed input electrodes for coupling said element to a source of alternating current quadrature phase bias signal through said fluid in phase quadrature with said reference bias signal;
   output means coupled to said elements through said output terminal for providing orthogonal drive control signals indicative of errors in level of said mount means; and
   drive means coupled to said output means and said movable member for controlling the attitude of said member in response to said drive control signals.

2. Attitude sensing apparatus, comprising:
   a housing;
   a movable conductive fluid in said housing;
   four input ohmic bias electrodes affixed to said housing and extending into said fluid arranged in a rhombic pattern;
   an output ohmic electrode affixed to said housing and centrally disposed with respect to said pattern;
   reference phase bias signal means coupled to a first pair of horizontal axis-defining, diagonally opposed said input electrodes for coupling said first pair through said fluid to a source of alternating current reference phase bias signal;

quadrature phase bias signal means coupled to the other pair of orthogonal horizontal axis-defining, diagonally opposed said input electrodes for coupling said other pair through said fluid to a source of alternating current quadrature phase bias signal in phase quadrature with said reference bias signal; and output means coupled to said input electrodes through said output electrode for providing output signals indicative of the attitude of said housing with respect to said conductive fluid and in accordance with impedance variations between said output and input electrodes.

3. Attitude sensing apparatus, comprising:

a housing;

a movable conductive fluid in said housing;

four input ohmic bias electrodes affixed to said housing and extending into said fluid arranged in a rhombic pattern;

an output ohmic electrode affixed to said housing and centrally disposed with respect to said pattern;

reference phase bias signal means coupled to a first pair of horizontal axis-defining, diagonally opposed said input electrodes for coupling said first pair through said fluid to a source of alternating current reference phase bias signal;

quadrature phase bias signal means coupled to the other pair of orthogonal horizontal axis-defining, diagonally opposed said input electrodes for coupling said other pair through said fluid to a source of alternating current quadrature phase bias signal in phase quadrature with said reference bias signal;

output means coupled to said element through said output electrode for providing output signals indicative of the attitude of said housing with respect to said conductive fluid and in accordance with impedance variations between said output and input electrodes; and balancing means coupled to said biasing means between said input electrodes and said biasing means for each said bias signal and including a variable voltage control for producing a variable reference voltage level to balance said quadrature and output signals with respect to said reference level.

4. Attitude sensing apparatus, comprising:

a housing;

a movable conductive fluid in said housing;

four input ohmic bias electrodes affixed to said housing and extending into said fluid arranged in a rhombic pattern;

an output ohmic electrode affixed to said housing and centrally disposed with respect to said pattern;

reference phase bias signal means coupled to a first pair of horizontal axis-defining, diagonally opposed said input electrodes for coupling said first pair through said fluid to a source of alternating current reference phase bias signal;

quadrature phase bias signal means coupled to the other pair of orthogonal horizontal axis-defining, diagonally opposed said input electrodes for coupling said other pair through said fluid to a source of alternating current quadrature phase bias signal in phase quadrature with said reference signal; and output means coupled to said input electrodes through said output electrode for providing output signals indicative of the attitude of said housing with respect to said conductive fluid and in accordance with impedance variations between said output and input electrodes, said output means including position resolution indicator means for a pair of orthogonal horizontal axes.

5. The attitude sensing apparatus of claim 3, wherein: said balancing means includes a variable resistor across each bias signal means, the movable tap of each said resistor being coupled together to an output terminal.

References Cited by the Examiner

UNITED STATES PATENTS 2,711,590   6/1955   Wilcox _____ 33—206.5
3,114,209   12/1963  Foody et al. _____ 33—206.5

FOREIGN PATENTS 920,617   1/1947   France.
665,628   1/1952   Great Britain.

LEONARD FORMAN, *Primary Examiner.*

WILLIAM D. MARTIN, JR., *Assistant Examiner.*